(12) United States Patent
Hirth et al.

(10) Patent No.: US 10,895,186 B2
(45) Date of Patent: Jan. 19, 2021

(54) ELECTRICALLY HEATABLE HONEYCOMB BODY FOR EXHAUST GAS TREATMENT HAVING A PLURALITY OF HEATING ELEMENTS

(71) Applicant: Continental Automotive GmbH, Hannover (DE)

(72) Inventors: Peter Hirth, Roesrath (DE); Christoph Pabst, Melle (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/322,807

(22) PCT Filed: Jul. 18, 2017

(86) PCT No.: PCT/EP2017/068066
§ 371 (c)(1),
(2) Date: Feb. 1, 2019

(87) PCT Pub. No.: WO2018/024477
PCT Pub. Date: Feb. 8, 2018

(65) Prior Publication Data
US 2019/0170039 A1 Jun. 6, 2019

(30) Foreign Application Priority Data

Aug. 4, 2016 (DE) .......................... 10 2016 214 495

(51) Int. Cl.
*F01N 3/20* (2006.01)
*F01N 3/28* (2006.01)
(Continued)

(52) U.S. Cl.
CPC ........... *F01N 3/2013* (2013.01); *B01D 53/94* (2013.01); *F01N 3/027* (2013.01); *F01N 3/281* (2013.01);
(Continued)

(58) Field of Classification Search
CPC ........ F01N 3/2013; F01N 3/027; F01N 3/281; F01N 224/16; F01N 2330/02; Y02A 50/2322; B01D 53/94
(Continued)

(56) References Cited

U.S. PATENT DOCUMENTS 5,140,812 A * 8/1992 Cornelison ........... F01N 3/2026
392/375
5,370,943 A 12/1994 Brück et al.
(Continued)

FOREIGN PATENT DOCUMENTS

CN 1086001 4/1994
CN 1547501 11/2004
(Continued)

*Primary Examiner* — Tom P Duong
(74) *Attorney, Agent, or Firm* — Cozen O'Connor

(57) ABSTRACT

A honeycomb body includes: a first end face; a second end face, the honeycomb body being configured to permit gas flow through the honeycomb body from the first end face to the second end face in a flow direction; and a plurality of at least partially structured sheet metal layers, layered one on top of the other and entwined with each other to form gas-permeable channels. At least one of the plurality of sheet metal layers is reinforced or replaced by at least two elongate electrical heating elements arranged approximately parallel to one another with a spacing one behind the other in the flow direction and extending transversely to the flow direction.

10 Claims, 3 Drawing Sheets

(51) Int. Cl.
  *F01N 3/027* (2006.01)
  *B01D 53/94* (2006.01)
  *H05B 3/06* (2006.01)

(52) U.S. Cl.
  CPC ............ *H05B 3/06* (2013.01); *F01N 2240/16* (2013.01); *F01N 2330/02* (2013.01); *F01N 2330/38* (2013.01); *F01N 2590/08* (2013.01); *H05B 2203/005* (2013.01); *H05B 2203/016* (2013.01); *Y02A 50/20* (2018.01); *Y02T 10/12* (2013.01)

(58) Field of Classification Search
  USPC .................................................. 422/168, 174
  See application file for complete search history.

(56) References Cited

U.S. PATENT DOCUMENTS

| | | |
|---|---|---|
| 5,474,746 A | 12/1995 | Maus et al. |
| 5,562,885 A | 10/1996 | Bayer et al. |
| 5,584,175 A | 12/1996 | Carlborg et al. |
| 5,686,164 A | 11/1997 | Maus et al. |
| 6,513,324 B2 | 2/2003 | Brück et al. |
| 6,540,816 B2 | 4/2003 | Allie et al. |
| 9,610,539 B2 | 4/2017 | Hirth et al. |
| 2008/0295482 A1* | 12/2008 | Gonze ................ F01N 3/027 60/273 |
| 2017/0016370 A1 | 1/2017 | Schlipf |

FOREIGN PATENT DOCUMENTS

| | | |
|---|---|---|
| CN | 101680339 | 3/2010 |
| DE | 4102890 A1 | 8/1992 |
| DE | 41 29 894 A1 | 3/1993 |
| DE | 4129893 A1 | 3/1993 |
| DE | 41 32 439 A1 | 4/1993 |
| DE | 4223134 A1 | 2/1994 |
| DE | 199 43 846 A1 | 3/2001 |
| DE | 10 2011 117 624 A1 | 5/2013 |
| DE | 19 2015 111 689 B3 | 10/2016 |
| EP | 0483256 A1 | 5/1992 |
| EP | 0569400 A1 | 11/1993 |
| EP | 0603222 A1 | 6/1994 |
| EP | 2773857 A1 | 9/2014 |

\* cited by examiner

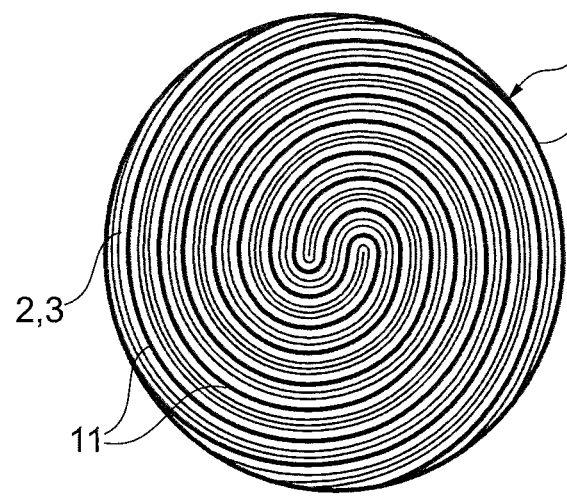
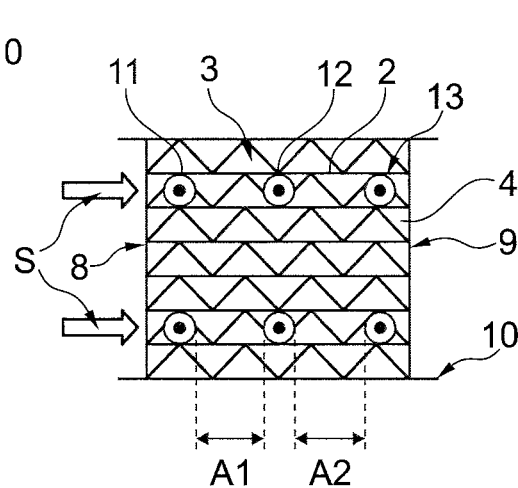
Fig. 1
Fig. 2
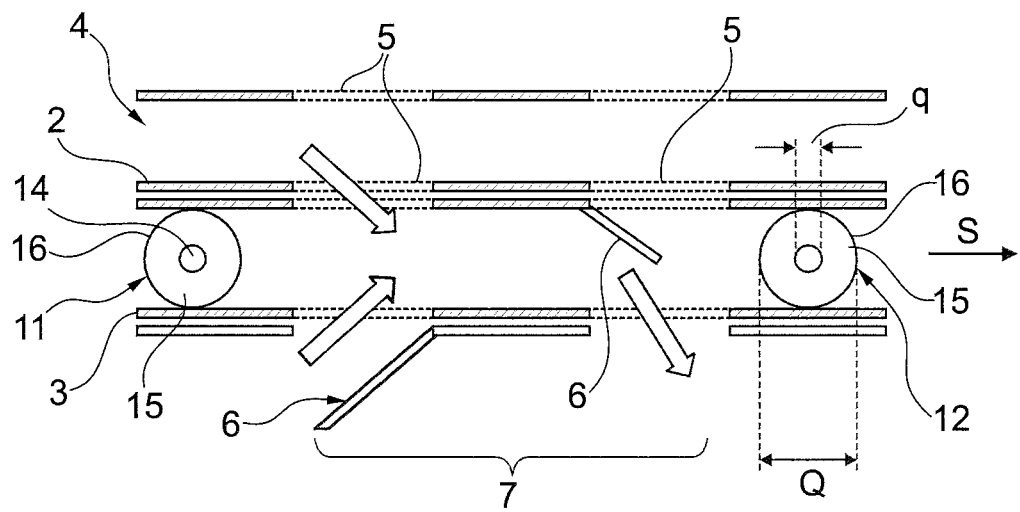
Fig. 3

ELECTRICALLY HEATABLE HONEYCOMB BODY FOR EXHAUST GAS TREATMENT HAVING A PLURALITY OF HEATING ELEMENTS

CROSS-REFERENCE TO RELATED APPLICATIONS

This is a U.S. national stage of international application No. PCT/EP2017/068066 filed on 18 Jul. 2017, which claims priority to the German Application No. 10 2016 214 495.2 filed 4 Aug. 2016, the content of both incorporated herein by reference.

BACKGROUND OF THE INVENTION

1. Field of the Invention

The present invention relates to the field of electrically heatable honeycomb bodies, in particular for use in the exhaust gas purification of internal combustion engines, preferably in motor vehicles.

2. Related Art

Electrically heatable honeycomb bodies are mainly used in motor vehicles as catalytic converter substrate bodies through which exhaust gas can flow and which, under certain operating conditions, for example during a cold start, are electrically heated to quickly reach a suitable temperature for catalytic reactions, or to maintain this even under unfavorable conditions.

Electrically heatable honeycomb bodies and their components have to achieve a long service life with constant electrical function despite high thermal fluctuating loads, aggressive environmental conditions and possible deposits, which places high demands on the materials and construction.

In recent developments, systems with a supply voltage of 24, 36 or even 48 V [Volt] are being considered instead of the 12 V in the supply network hitherto widely used in motor vehicles. This also places particular demands on electrical insulations and the electrical resistance to be selected in electrically heated honeycomb bodies. At higher voltages, it is scarcely possible for a honeycomb body as a whole to be configured as a heating resistor. Separate heating elements must be provided.

From EP 0 603 222 B1 it is already known to lay an electrical conductor as a sensor or a heating conductor in an electrically insulated manner in the interior of a honeycomb body. For this purpose, the electrical conductor is arranged in an electrically insulated manner between two metal sheets, which form either smooth or corrugated sheet metal layers for building a honeycomb body. In EP 0 603 222 B1 it is also described in principle how such a heating conductor is passed through the jacket tube to the outside, where it can then be connected to a power supply. For heating conductors with larger cross sections or insulation suitable for higher voltages, however, it becomes more and more difficult to realize the described concept because the sheet-metal layer with the heating conductor becomes ever stiffer and harder to process.

From EP 0 569 400 B1, it is known to use parts of the sheet metal layers which form a honeycomb body through slots and a special configuration of the sheet metal layers as heating conductors. In this case, too, as the supply voltage increases, it becomes increasingly difficult to set suitable resistances and to ensure the dielectric strength of the electrical insulations.

EP 2 773 857 B1 discloses an attachment of an electrical heating element to an end face of a honeycomb body, in particular in an end-face groove. Although this allows the attachment of even thick heating elements, it leads to heating of the honeycomb body only on the end face.

Furthermore, it is known from EP 0 483 256 B1 to provide a honeycomb body with internal openings and flow-guiding surfaces to influence the course of the flow in the honeycomb body.

SUMMARY OF THE INVENTION

It is an object of the present invention to provide a structure for an electrically heatable honeycomb body which is also suitable for supply voltages above 12 V and in which the distribution of the heating power in the interior of the honeycomb body can be selected within wide limits through selection of the design parameters. It is furthermore sought for the pressure loss to be kept low by the electric heating for a gas flowing through the honeycomb body.

This object may be achieved by a honeycomb body as set forth herein. Advantageous refinements that may be used individually or in technologically expedient combinations with one another are specified below as well.

A honeycomb body according to a first aspect of the invention, which can be flowed through by a gas from a first end face to a second end face in a flow direction, is constructed from at least partially structured sheet metal layers, which are layered one on top of the other and entwined with each other and which form gas-permeable channels. At least one of the sheet metal layers is reinforced or replaced by at least two elongate electrical heating elements arranged approximately parallel and with a spacing one behind the other in the flow direction and extend transversely to the flow direction.

EP 0 603 222 B1 describes, by way of example, how a heating element can be integrated into a smooth or corrugated sheet-metal layer as a reinforcement and a honeycomb body can be wound therefrom. It can be seen, however, that this conventional method of EP 0 603 222 B1 is limited with increasing thickness of the heating element.

If the thickness of the heating element moves into the same order of magnitude as the dimensions of the channels of a honeycomb body in cross section, one can, according to an aspect of the invention simply omit the sheet metal layer in question, because at least two heating elements can perform virtually the same mechanical function as a corrugated sheet metal layer during the winding of a honeycomb body.

In any case, electrical heating elements, which are usually also surrounded by electrical insulation, have in the present usage situation such large cross sections that they have a considerable influence on the flow resistance exerted by the honeycomb body on a gas flowing through it. The heating elements obstruct a part of the cross section of the honeycomb body which is otherwise available for the flow. Therefore, according to an aspect of the invention, two or more heating elements, which are required for sufficient heating one behind the other in the flow direction, are arranged one behind the other in the flow direction specifically such that the second heating element and any further following heating elements do not obstruct any further additional cross-sectional areas. Of course, it may be that, for heating a honeycomb body, depending on the configuration thereof, several heating elements are required in a cross-sectional plane of the honeycomb body; then, the above statements apply analogously to further heating elements arranged downstream of the heating elements in the flow direction. The heating elements may, in a manner already known, be integrated into one or more of the sheet metal layers of the honeycomb body as reinforcement, for example by rolling or connection produced by joining technology (welding, soldering, sintering, etc.), but in the usage situations discussed here, the dimensions of the cross section of the heating elements are of the same order of magnitude as the cross sections of the channels of the honeycomb body or even larger. This makes it possible, instead of using a corrugated or smooth sheet metal layer, for two or more heating elements to be layered and wound with the other metal sheets. All sequences of layers that are conceivable here are possible, so that the heating elements can adjoin either two adjacent smooth layers or two adjacent corrugated layers or an adjacent corrugated layer and a smooth layer. Here, manufacturing aspects can be taken into account, as well as issues of heat conduction to the adjacent metal sheets or the surrounding flow of the gas. While it may be necessary, in the integration of the heating elements into one of the sheet metal layers, to take into account the additional space required for their shaping and possibly the shaping of adjacent layers, this is not necessary if one of the sheet metal layers is simply replaced by two or more heating elements. If required, it is also possible for structured, in particular corrugated, sheet metal layer portions to be arranged upstream, between and/or downstream of the heating elements in the flow direction, which sheet metal layer portions have the same height as the heating elements.

In a first preferred embodiment of the invention, the honeycomb body is constructed from alternately arranged smooth and corrugated sheet metal layers intertwined with each other, wherein at least one smooth sheet metal layer is reinforced or replaced by heating elements. In the case of this configuration, heat can be dissipated from the heating elements via points of contact with adjacent corrugated sheet metal layers, and the heating elements can be flowed around by gas, so that heat can also be discharged directly to the gas flowing through the honeycomb body.

In another preferred embodiment, the honeycomb body according to an aspect of the invention is constructed from alternately arranged smooth and corrugated sheet metal layers intertwined with each other, wherein at least one corrugated sheet metal layer is reinforced or replaced by heating elements. The channels formed by the corrugated sheet metal layer, or the gap that arises between two smooth sheet metal layers in the case of the sheet metal layer being completely replaced by the heating elements, is substantially blocked by the heating elements, so that in this variant, the heat dissipation takes place from the heating conductor to the adjacent sheet metal layers, which may be advantageous depending on the application of the heating.

The heating elements are preferably heating conductors with a metal jacket surrounding them in an electrically insulated manner. Such jacketed conductors and the lead-through thereof through a jacket tube of a honeycomb body to an electrical connection outside of the honeycomb body are known for example from the abovementioned EP 0 603 222 B and can be produced in almost any desired length and with a suitable conductor cross section.

Typically, heating elements have a round cross section, but it is also possible according to an aspect of the invention to use heating conductors with a flattened cross section, which can be achieved in particular by rolling conventional jacketed conductors. In this case, the heating elements are arranged with the larger cross-sectional dimension in the flow direction and with the smaller cross-sectional dimension in the radial direction (transverse to the flow direction) in the honeycomb body.

According to an aspect of the invention, the electrical heating elements have an electrically conductive cross section of 0.02 to 3 mm$^2$, preferably 0.05 to 2 mm$^2$ [square millimeters]. The exact dimensioning depends on the supply voltage, the desired electrical power and the length of the heating element, which in turn depends on the configuration and size of the respective electrically heatable honeycomb body.

According to an aspect of the invention, the heating elements are configured to operate at voltages of 24 to 48 V [volts] and can collectively receive an electrical power of 500 to 5000 W [watts], preferably 1000 to 3000 W, whereby rapid and adequate heating of the honeycomb body under different operating conditions is made possible.

As mentioned above, the heating elements block certain cross-sectional areas in the honeycomb body, which are therefore not available for a flow. According to an aspect of the invention, this can be greatly alleviated if, in the sheet metal layers, openings and/or flow-guiding elements are present, which can divert the gas even into regions of the honeycomb body at least partially blocked by the heating elements, and out of those regions. This embodiment improves the heat exchange directly to the gas flowing through and is particularly advantageous if the heating elements are integrated into a corrugated layer, replace the latter or, as mentioned above, are used in conjunction with corrugated sheet metal layer portions arranged upstream of, between and/or downstream of the heating elements and which have the same height as the heating elements. In this way, almost all regions of the honeycomb body, in particular also those between the heating elements, are flowed through by gas and contribute to the exhaust gas treatment.

It should be mentioned that, according to an aspect of the invention, at least three heating elements can be present in the honeycomb body, which have different spacings to one another in the flow direction. This makes it possible for the honeycomb body to be heated inhomogeneously in the flow direction, for example more intensely in the front region than in the rear region, which may be advantageous for example in a cold start phase.

As known from the prior art, it is often useful for the stability of a honeycomb body that the sheet metal layers are interconnected. According to the invention, the heating elements can also, at least in partial regions, be connected by joining techniques, to adjacent sheet metal layers in order to achieve high stability and better heat conduction.

BRIEF DESCRIPTION OP THE DRAWINGS

Embodiments of the invention and further details will be explained in more detail with reference to the following drawing, wherein features shown in different figures may also, according to the invention, be used jointly. In the drawings:

FIG. 1 shows a schematic cross section through a honeycomb body;

FIG. 2 shows a schematic longitudinal section through a honeycomb body with a corrugation rotated through 90° for illustrative purposes;

FIG. 3 shows a schematic detail of a longitudinal section through a honeycomb body;

Figure 4:
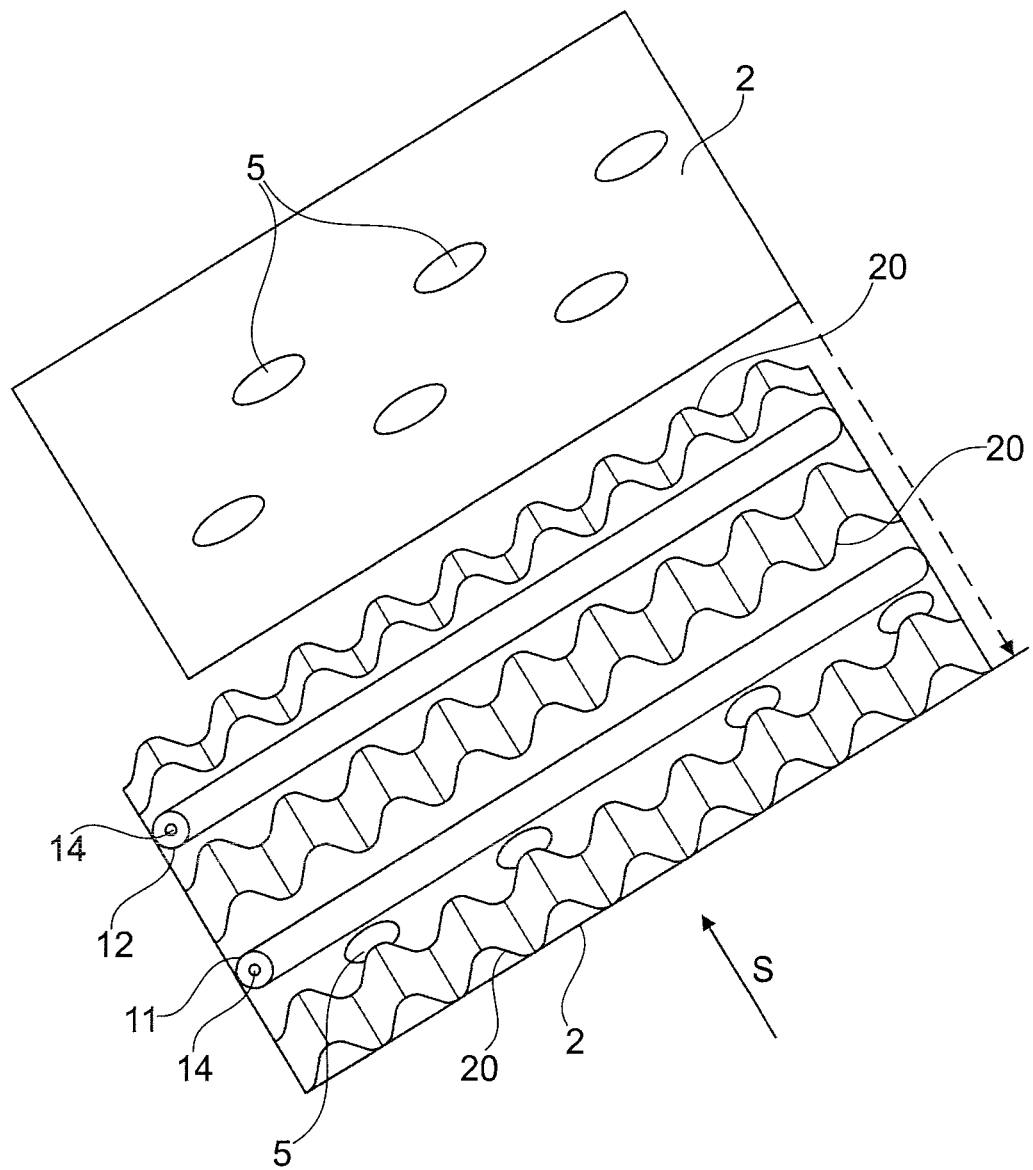
Figure 5:
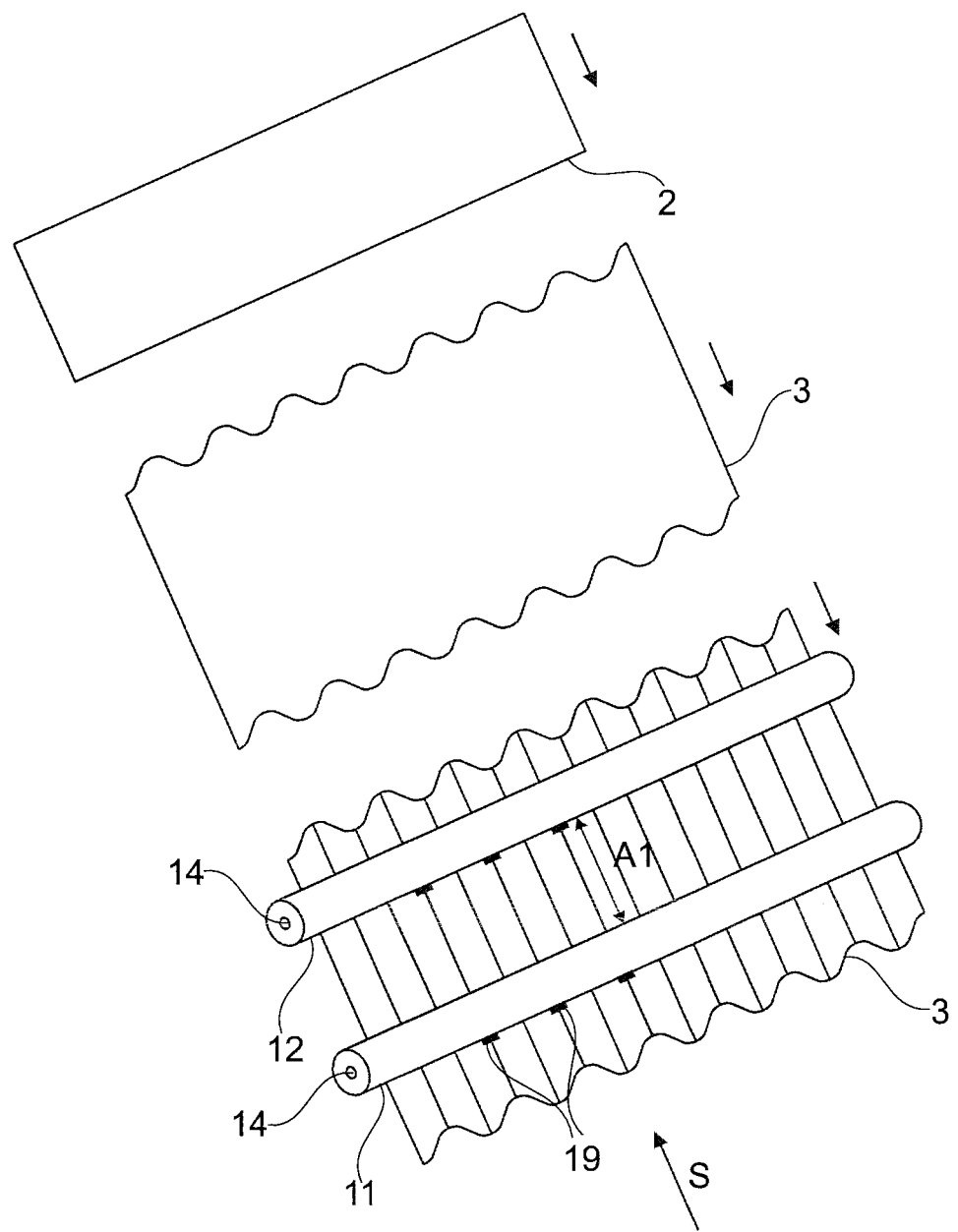

FIG. 4 schematically shows the construction of a metal sheet stack for producing a honeycomb body; and FIG. 5 schematically shows another arrangement of metal sheets and heating elements for the construction of a honeycomb body.

DETAILED DESCRIPTION OF THE PRESENTLY PREFERRED EMBODIMENTS

FIG. 1 schematically shows a cross section through an electrically heatable honeycomb body 1 according to an aspect of the invention, which is constructed from smooth 2 and corrugated 3 sheet metal layers. The present exemplary embodiment involves a honeycomb body constructed from an intertwined sheet metal stack with two heating elements 11, which means that also two heating elements 11 are used for heating a cross-sectional region. The entire honeycomb body is surrounded by a jacket tube, through which the heating elements 11 are guided in a manner known per se to the outside to an electrical connection (not illustrated).

FIG. 2 shows a schematic longitudinal section through a honeycomb body 1 according to an aspect of the invention, wherein corrugated sheet metal layers 3 are illustrated by zigzag lines, although the corrugation actually runs rotationally offset by 90° with respect to the zigzag lines shown. The honeycomb body 1 is composed of alternately arranged smooth sheet metal layers 2 and corrugated sheet metal layers 3, which form channels 4, one of the sheet metal layers being reinforced by (or completely replaced by) three heating elements 11, 12, 13. Through the honeycomb body 1, a gas can flow in a flow direction S from a first end face 8 to a second end face 9, wherein the three heating elements are arranged one behind the other in the flow direction S so that they respectively block the same regions of the flow cross section. The first heating element 11 and the second heating element 12 have the spacing A1 in the flow direction S, the second heating element 12 and the third heating element 13 have the spacing A2, wherein A1 and A2 may be selected to be different depending on the desired distribution of the heating power in the honeycomb body 1.

FIG. 3 schematically shows a part of a longitudinal section through a honeycomb body 1 according to an aspect of the invention, which in turn is constructed from smooth sheet metal layers 2 and corrugated sheet metal layers 3. Into one corrugated sheet metal layer 3, a first heating element 11 and a second heating element 12 are integrated one behind the other in the flow direction S. In this way, a region 7 blocked for the gas flowing through the honeycomb body would arise if openings 5 and/or flow-guiding elements 6 were not present in the sheet metal layers 2, 3, which lead to a flow also through the region 7 between the heating elements. As openings 5 and flow-guiding elements 6, use may be made of numerous embodiments known from the prior art. In the present exemplary embodiment, the heating elements 11, 12 have a cross section Q, which corresponds approximately to the cross section of the channels 4. The heating conductors 14 in the interior of the heating elements 11, 12 are surrounded by an electrical insulating layer 15 of an outer metal jacket 16.

FIG. 4 schematically shows an exemplary embodiment for the construction of a stack of smooth sheet metal layers 2 and corrugated sheet metal layers 3, wherein here an embodiment is shown in which only sheet metal layer portions 20 with interposed heating elements 11, 12, rather than an entire corrugated sheet metal layer, are provided. In this example, openings 5 are provided in the smooth sheet metal layers 2 adjacent to the heating elements 11, 12, which openings contribute to the better distribution of a gas flow in the honeycomb body.

FIG. 5 schematically shows an alternative construction of a stack of sheet metal layers 2, 3 for winding a honeycomb body. In this example, two heating elements 11, 12 lie with a spacing A1 between two corrugated sheet metal layers 3. The rest of the stack is constructed from alternating smooth 2 and corrugated 3 sheet metal layers. In this arrangement, no regions which are completely blocked for a gas flowing through arise. In order to improve the heat conduction to the adjacent corrugated sheet metal layers, connections 19 produced by a joining technique, in particular soldered connections, can be provided between the heating elements 11, 12 and the adjacent undulation peaks. Very generally, soldered connections, and also large-area connections in the case of smooth sheet metal layers, between the heat conductors and adjacent sheet metal layers 2, 3 improve the heat distribution in the honeycomb body.

The present invention is particularly suitable for use in exhaust-gas purification systems of motor vehicles, in particular in the case of a 24, 36, or 48 V power supply, and is scarcely susceptible to electrical flashovers, for example in the event of deposits or corrosion.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A honeycomb body (1), comprising:
a first end face (8);
a second end face (9), the honeycomb body (1) being configured to permit gas flow through the honeycomb body (1) from the first end face (8) to the second end face (9) in a flow direction (S); and
a plurality of at least partially structured sheet metal layers (2, 3), layered one on top of the other and entwined with each other to form gas-permeable channels (4),
wherein at least one of the plurality of sheet metal layers (2, 3) is replaced by at least two elongate electrical heating elements (11, 12) arranged approximately parallel to one another with a spacing one behind the other in the flow direction and extending transversely to the flow direction, and
wherein the honeycomb body (1) comprises alternately arranged smooth (2) and corrugated (3) sheet metal layers intertwined with each other, and wherein at least one smooth sheet metal layer (2) is replaced by the heating elements (11, 12), such that the heating elements (11, 12) are sandwiched between two corrugated sheet metal layers.

2. A honeycomb body (1), comprising:

a first end face (8);

a second end face (9), the honeycomb body (1) being configured to permit gas flow through the honeycomb body (1) from the first end face (8) to the second end face (9) in a flow direction (S); and a plurality of at least partially structured sheet metal layers(2, 3), layered one on top of the other and entwined with each other to form gas-permeable channels (4), wherein at least one of the plurality of sheet metal layers(2, 3) is replaced by at least two elongate electrical heating elements (11, 12) arranged approximately parallel to one another with a spacing one behind the other in the flow direction and extending transversely to the flow direction, and wherein the honeycomb body (1) comprises alternately arranged ones of the smooth (2) and corrugated (3) sheet metal layers intertwined with each other, and wherein at least one corrugated sheet metal layer (3) is replaced by the heating elements (11, 12), such that the heating elements (11, 12) are sandwiched between two smooth sheet metal layers.

3. The honeycomb body (1) as claimed in claim 1, wherein the heating elements (11, 12) are heating conductors (14) with a metal jacket (16) surrounding them in an electrically insulated manner.

4. The honeycomb body (1) as claimed in claim 1, wherein the heating elements (11, 12) have a round or flattened cross section (Q).

5. The honeycomb body (1) as claimed claim 1, wherein the electrical heating elements (11, 12) have an electrically conductive cross section (q) of 0.02 to 3 mm2.

6. The honeycomb body (1) as claimed in claim 1, wherein the heating elements (11, 12) are configured for operating voltages of 24 to 48 V and configured to collectively receive an electrical power of 500 to 5000 W.

7. The honeycomb body (1) as claimed in claim 1, further comprising, in the sheet metal layers (2, 3), openings (5) and/or flow-guiding elements (6) configured to divert the gas into regions (7) of the honeycomb body (1) at least partially blocked by the heating elements (11, 12), and out of said at least partially blocked regions.

8. The honeycomb body (1) as claimed in claim 1, wherein the honeycomb body (1) comprises at least three heating elements (11, 12, 13), each of which having different spacings (A1, A1) with respect to one another in the flow direction (S).

9. The honeycomb body (1) as claimed in claim 1, wherein the sheet metal layers (2, 3) are connected to each other and/or to the heating elements (11, 12) at least in partial regions by connections (19) produced by a joining technique.

10. The honeycomb body (1) according to claim 9, wherein the joining technique is soldering.

* * * * *